United States Patent [19]

Luders et al.

[11] 3,931,104
[45] Jan. 6, 1976

[54] PLASTICS STABILIZED AGAINST ULTRAVIOLET RADIATION

[75] Inventors: Walter Luders, Neu-Isenburg; Edgar Fischer, Frankfurt am Main, both of Germany

[73] Assignee: Hoechst Aktiengesellschaft, Frankfurt am Main, Germany

[22] Filed: June 10, 1974

[21] Appl. No.: 477,834

[30] Foreign Application Priority Data
June 12, 1973 Germany............................ 2329782

[52] U.S. Cl. .................. 260/45.85 R; 260/45.7 P; 260/45.7 PS; 260/45.9 NP; 260/45.95 L; 260/45.95 S
[51] Int. Cl.² ........................................ C08G 6/00
[58] Field of Search ............... 260/45.7 P, 45.9 NP, 45.85 R, 260/45.7 PS, 45.95 L

[56] References Cited
UNITED STATES PATENTS

| | | | |
|---|---|---|---|
| 3,269,963 | 8/1966 | Ilgemann et al. | 260/45.7 |
| 3,341,625 | 9/1967 | Gillham et al. | 260/45.9 |
| 3,532,668 | 10/1970 | Savides | 260/45.9 |
| 3,594,346 | 7/1971 | Hermann et al. | 260/45.9 |
| 3,629,365 | 12/1971 | Gardner | 260/45.7 |
| 3,676,393 | 7/1972 | Piirma | 260/45.7 |

*Primary Examiner*—V. P. Hoke
*Attorney, Agent, or Firm*—Curtis, Morris & Safford

[57] ABSTRACT

Thermoplastic polymers are stabilized against ultraviolet radiation by incorporating therein as a stabilizer a stabilizing amount, e.g., 0.1 to 5% by weight of a tertiary phosphine oxide or sulfide of the general formula:

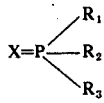

in which X is oxygen or sulfur and $R_1$, $R_2$ and $R_3$ are each selected from hydroxyalkyl, haloalkyl, carbalkoxyalkyl, acyloxyalkyl, phenylhydroxyalkyl wherein the phenyl radical may be substituted by one or more halogens, and cyanoalkyl wherein the alkyl radical has 1 to 6 carbon atoms.

16 Claims, No Drawings

PLASTICS STABILIZED AGAINST ULTRAVIOLET RADIATION

It is already known that plastics, for example polyolefines, are attacked and gradually destroyed by the action of ultraviolet radiation, for example ultraviolet radiation of the sunlight. In order to reduce this destruction, so-called inhibitors or stabilizers are added to the plastics.

The present invention therefore provides plastics stabilized against ultraviolet radiation and containing as stabilizer a compound of the formula

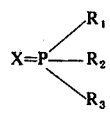

wherein X represents an oxygen or sulfur atom, $R_1$ and $R_2$ are either β-cyanoethyl radicals or have the same definition as $R_3$, $R_3$ represents a hydroxyalkyl or a hydroxyalkylphenyl group, the phenyl radical of the latter being optionally substituted by one or more halogen atoms, or a halogenoalkyl carbalkoxyalkyl, acyloxyalkyl or cyanoalkyl group the alkyl radical of which has from 1 to 6 carbon atoms.

The tertiary phosphine oxides to be used according to the invention can be prepared by various known methods, for example by hydrolysis of phosphine dihalides or quaternary phosphonium compounds, by Michael's-Arbusov's-reaction from phosphinous acid esters, or most simply by direct oxidation of the corresponding tertiary phosphines.

The tertiary phosphine sulfides to be used according to the invention can be easily prepared by the addition of elementary sulfur on the corresponding tertiary phosphines according to known methods. Suitable tertiary phosphine oxides are for example bis-(2-cyanoethyl)-hydroxymethyl-phosphine oxide, bis-(2-cyanoethyl)-1-hydroxyethyl-phosphine oxide, bis-(2-cyanoethyl)-2-chloro-1-hydroxyethyl-phosphine oxide, bis-(2-cyanoethyl)-2,2,2-trichloro-1hydroxyethyl-phosphine oxide, bis-(2-cyanoethyl)-1-hydroxycyclohexyl-phosphine oxide, bis-(2-cyanoethyl)-2-carboxymethylethyl-phosphine oxide, bis-(2-cyanoethyl)-1,2-dicarboxymethylethyl-phosphine oxide, bis-(2-cyanoethyl)-2,2-dichloro-1-hydroxy-ethyl-phosphine oxide, bis-(2-cyanoethyl)-bis-chloromethyl-hydroxy-methyl-phosphine oxide, bis-(2-cyanoethyl)-1-hydroxy-2-phenyl-ethyl-phosphine oxide, bis-(2-cyanoethyl)-1-hydroxyl-1-phenyl-2-chloro-ethyl-phosphine oxide, bis-(2-cyanoethyl)-1-hydroxy-1-phenyl-ethyl-phosphine oxide, bis-(2-cyanoethyl)-1-hydroxy-1-(4-bromophenyl)-ethyl-phosphine oxide, bis-(2-cyanoethyl)-hydroxy-(2,4-dichlorophenyl)-methyl-phosphine oxide.

Tris-chloromethyl-phosphine oxide, oxethylated tris-hydroxymethyl-phosphine oxide, tris-hydroxymethyl-phosphine oxide, oxpropylated tris-hydroxymethyl-phosphine oxide, tris-(2-cyanoethyl)-phosphine oxide, tris-acetoxymethyl-phosphine oxide, tris-stearoyloxymethyl-phosphine oxide, tris-benzoyloxymethyl-phosphine oxide, tris-(2-carbethoxy)-ethyl-phosphine oxide, tris-(1-hydroxy-2-chloro-ethyl)-phosphine oxide, tris-(1-hydroxy-1-phenyl-ethyl)-phosphine oxide.

Suitable tertiary phosphine sulfides are, for example, tris-hydroxymethyl-phosphine sulfide, tris-(2-cyanoethyl)-phosphine sulfide, tris-stearoyloxy-methyl-phosphine sulfide, tris-(2-carbomethoxy)-ethyl-phosphine sulfide, bis-(2-cyanoethyl)-hydroxymethyl-phosphine sulfide. The compounds to be used according to the invention are especially suitable as stabilizers against ultraviolet radiation for polyethylene, polypropylene, polybutene, poly-(4-methyl-1-pentene), copolymers of these substances as well as for polystyrene.

They are added to the polymers in an amount of 0.1 to 5 % by weight, preferably of 0.5 to 2 % by weight.

They may be incorporated into the polymer in the usual manner, for example by mixing, kneading or grinding. In this process it may also be advantageous to use mixtures of the additives.

Moreover, further components, such as pigments, lubricants, fillers or antistatic agents may be added to the plastics. In most applications, it can also be desirable to use antioxidants, for example of thiodipropionic acid or distearyl sulfide type and/or antioxidants corresponding to the general formulae

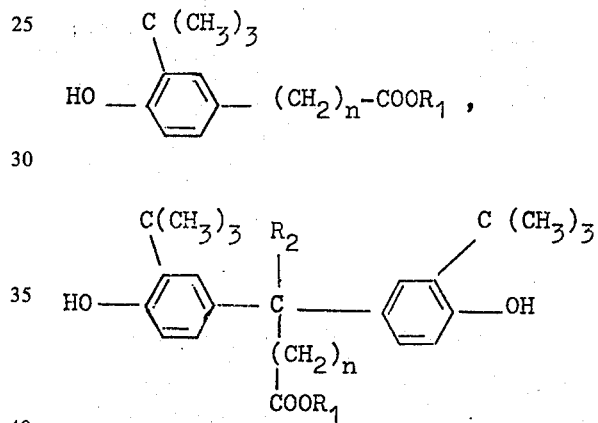

wherein
$n = 0–6$
$R_1$ = alkyl having from 1 to 20 C-atoms
$R_2$ = alkyl having from 1 to 6 C-atoms The compounds of the invention differ from known UV-absorbers containing hydroxyl groups in not being colored, even after exposure to ultraviolet light, as well as in their partly better stabilizer properties.

The invention is illustrated by the following examples.

EXAMPLES 1–13

100 Parts of polypropylene stabilized with 0.1 % of 2,2-isopropylidene-bis-(4-isononylphenol) and 0.25 % of thiodipropionic acid lauryl ester are mixed with one part of the additives mentioned below in a kneader-mixer provided with heating means at a temperature of 200°C.

In order to determine the stabilizing effect under the action of ultraviolet light, the brittle time of sheets mounted on an aluminium foil and having a thickness of 100 μ is measured by means of the Xenon test apparatus 450 of the Cassella system, manufactured by Messrs. Heraeus at Hanau (W. Germany); it is the time after which the test sheet exhibits a clod-like rupture by pulling a cotton thread imbedded therein.

The results are summarized in the following table.

| Example No. | stabilizer | brittle time (hours) | color after exposure to ultra-violet radiation |
|---|---|---|---|
| 1 | bis-(2-cyanoethyl)-hydroxymethyl-phosphine oxide | 910 | colorless |
| 2 | bis-(2-cyanoethyl)-1-hydroxy-ethyl-phosphine oxide | 850 | colorless |
| 3 | bis-(2-cyanoethyl)-2-chloro-1-hydroxyethyl-phosphine oxide | 860 | faintly yellow |
| 4 | bis-(2-cyanoethyl)-2,2,2-tri-chloro-1-hydroxyethyl-phosphine oxide | 780 | faintly yellow |
| 5 | bis-(2-cyanoethyl)-1,2-dicarboxy-methylethyl-phosphine oxide | 910 | colorless |
| 6 | tris-hydroxymethyl-phosphine oxide | 1025 | colorless |
| 7 | oxethylated tris-hydroxymethyl-phosphine oxide | 1280 | colorless |
| 8 | oxpropylated tris-hydroxymethyl-phosphine oxide | 830 | colorless |
| 9 | tris-2-(cyanoethyl)-phosphine sulfide | 1125 | colorless |
| 10 | tris-stearoyloxymethyl-phosphine sulfide | 880 | colorless |
| 11 | tris-(2-carbmethoxy)-ethyl-phosphine sulfide | 810 | colorless |
| 12 | comparative experiment without an additive | 162 | |
| 13 | 2-(2'-hydroxy-3', 5'-di-tert.-butylphenyl)-5-chloro-benzotriazole | 920 | yellow |

What is claimed is:

1. A plastic material consisting essentially of a polymer selected from homopolymers and copolymers of ethylene, propylene, butene and 4-methyl-1-pentene and polystyrene and from 0.5 to 2% by weight of an ultra-violet radiation stabilizer which is a tertiary phosphine oxide or sulfide of the formula

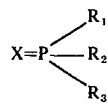

in which X is oxygen or sulfur and either (a) $R_1$ and $R_2$ are β-cyano-ethyl and $R_3$ is a radical other than β-cyanoethyl selected from the group of radicals consisting of hydroxyalkyl, haloalkyl, hydroxy haloalkyl carbalkoxyalkyl, acyloxyalkyl, phenylhydroxyalkyl wherein the phenyl radical may be substituted by one or more halogens, and cyanoethyl wherein the alkyl radical has 1 to 6 carbon atoms or (b) $R_1$, $R_2$ and $R_3$ are the same and each is selected from said group of radicals.

2. A plastic material according to claim 1 wherein said polymer is polypropylene.

3. A plastic material according to claim 1 wherein at least one of $R_1$, $R_2$ and $R_3$ is hydroxyhaloalkyl.

4. A plastic material according to claim 1 wherein said stabilizer is bis-(2-cyanoethyl)-hydroxymethyl-phosphine oxide.

5. A plastic material according to claim 1 wherein said stabilizer is bis-(2-cyanoethyl)-1-hydroxyethyl-phosphine oxide.

6. A plastic material according to claim 1 wherein said stabilizer is bis-(2-cyanoethyl)-2-chloro-1-hydroxyethyl-phosphine oxide.

7. A plastic material according to claim 1 wherein said stabilizer is bis-(2-cyanoethyl)-2,2,2-tri-chloro-1-hydroxyethyl-phosphine oxide.

8. A plastic material according to claim 1 wherein said stabilizer is bis-(2-cyanoethyl)-1,2-dicarboxymethylethyl-phosphine oxide.

9. A plastic material according to claim 1 wherein said stabilizer is tris-hydroxymethyl-phosphine oxide.

10. A plastic material according to claim 1 wherein said stabilizer is oxethylated tris-hydroxymethyl-phosphine oxide.

11. A plastic material according to claim 1 wherein said stabilizer is oxpropylated tris-hydroxymethyl-phosphine oxide.

12. A plastic material according to claim 1 wherein said stabilizer is tris-(2-cyanoethyl)-phosphine sulfide.

13. A plastic material according to claim 1 wherein said stabilizer is tris-stearolyoxymethyl-phosphine sulfide.

14. A plastic material according to claim 1 wherein said stabilizer is tris-(2-carbmethoxy)-ethyl-phosphine oxide.

15. A thermoplastic polymer containing a stabilizing amount of an ultra-violet radiation stabilizer which is a tertiary phosphine oxide or sulfide of the formula

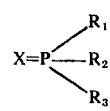

in which X is oxygen or sulfur and $R_1$, $R_2$ and $R_3$ are each selected from hydroxyalkyl, haloalkyl, hydroxy haloalkyl carbalkoxyalkyl, acyloxyalkyl, phenylhydroxyalkyl wherein the phenyl radical may be substituted by one or more halogens, and cyanoalkyl wherein the alkyl radical has 1 to 6 carbon atoms, provided that said stabilizer does not contain more than two cyanoalkyl groups.

16. A thermoplastic polymer according to claim 15 containing from 0.5 to 2% by weight of said stabilizer.

* * * * *

UNITED STATES PATENT AND TRADEMARK OFFICE
CERTIFICATE OF CORRECTION

PATENT NO. : 3,931,104
DATED : January 6, 1976
INVENTOR(S) : Luders et al.

It is certified that error appears in the above-identified patent and that said Letters Patent are hereby corrected as shown below:

Claim 1, line 40 to 41, change "hydroxy haloalkyl carbalkoxyalkyl" to --hydroxyhaloalkyl, carbalkoxyalkyl--;

Claim 15, line 53, add a hyphen (-) after "hydroxy";

line 54, add a comma (,) after "haloalkyl".

Signed and Sealed this twenty-sixth Day of July 1977

[SEAL]

Attest:

RUTH C. MASON
Attesting Officer

C. MARSHALL DANN
Commissioner of Patents and Trademarks